United States Patent [19]
Römer

[11] Patent Number: 6,116,584
[45] Date of Patent: Sep. 12, 2000

[54] AIR SPRING STRUT FOR MOTOR VEHICLE WHEEL SUSPENSIONS

[75] Inventor: Matthias Römer, Altdorf, Germany

[73] Assignee: DaimlerChrysler AG, Stuttgart, Germany

[21] Appl. No.: 09/340,017

[22] Filed: Jul. 6, 1999

[30] Foreign Application Priority Data

Feb. 27, 1999 [DE] Germany ............................ 199 08 607

[51] Int. Cl.[7] ........................................................ F16F 9/04
[52] U.S. Cl. .................................... 267/64.24; 267/64.26; 267/34
[58] Field of Search ............................ 267/64.19, 64.21, 267/64.23, 64.26

[56] References Cited

U.S. PATENT DOCUMENTS

| | | | |
|---|---|---|---|
| 5,375,683 | 12/1994 | Huang et al. | 188/322.13 |
| 5,487,535 | 1/1996 | Carter et al. | 267/220 |
| 5,667,203 | 9/1997 | Romer | 267/64.23 |
| 5,810,335 | 9/1998 | Wirtz et al. | 267/221 |

FOREIGN PATENT DOCUMENTS 197 53 637  6/1998  Germany .

*Primary Examiner*—Chris Schwartz
*Attorney, Agent, or Firm*—Klaus J. Bach

[57] ABSTRACT

In an air spring strut for a wheel suspension of a motor vehicle including an air spring head to be mounted to a vehicle body, a shock absorber having a piston rod resiliently supported in the air spring head and a cylinder receiving the piston rod with a damper piston, a tubular air spring piston mounted to the cylinder and extending therefrom into a cylindrical extension of the air spring head and a rolling sleeve bellows connected to the air spring piston and the cylindrical extension, the air spring piston is connected to the shock absorber cylinder elastically and has at its opposite end a slide structure disposed around a guide structure extending from the air spring head for slideably supporting the end of the tubular air spring piston to prevent adjacent wall portions of the rolling sleeve bellows from contacting each other.

16 Claims, 2 Drawing Sheets

AIR SPRING STRUT FOR MOTOR VEHICLE WHEEL SUSPENSIONS

BACKGROUND OF THE INVENTION

The invention resides in an air spring strut for wheel suspensions of motor vehicles including an air spring head supported on the vehicle body and an outer guide structure for an air bellows, whose inner guide structure is formed by an air spring piston which surrounds a shock absorber having a piston mounted in the air spring head and a dampening cylinder connected to the wheel suspension and which sealingly engages the damping cylinder.

Such air spring struts are known, for example, from DE 197 53 637 A1. As vehicle spring struts, they are well known under the name McPherson struts, which are in wide use as wheel guide and support elements. They are connected at their lower ends to transverse wheel links and are attached at their top end to the vehicle body. However, in such an arrangement, the wheel support forces generate transverse forces on the shock absorber included in the strut, which adversely affects the spring characteristics. The object of DE 197 23 637 A1 is to generate forces and which counteract those transverse forces and which reduce the friction in the shock absorber, which friction detrimentally affects the response behavior of the strut. To achieve this, the air spring bellows in connection with a rigid connection of the air spring piston or the damper tube of the shock absorber is so designed that appropriate transverse forces are generated in a pressure-dependent manner.

It is the object of the present invention to provide an air spring strut with a shock absorber, which is essentially not subjected to transverse forces so that the response behavior of the spring strut is improved. Also, the strut should be relatively slim and spring and steering movements which move the strut out of its design position should not negatively affect the response characteristics of the spring and especially of the shock absorber inspite of transverse forces effective on the strut.

SUMMARY OF THE INVENTION

In an air spring strut for a wheel suspension of a motor vehicle including an air spring head to be mounted to a vehicle body, a shock absorber having a piston rod is resiliently supported in the air spring head. The shock absorber includes a cylinder which receives the piston rod and a damper piston attached thereto and a tubular air spring piston is mounted to the cylinder and extends therefrom into a cylindrical extension of the air spring head. A rolling sleeve bellows is connected to the air spring piston and the cylindrical extension and the air spring piston is connected to the shock absorber cylinder elastically and has at its opposite end a slide structure disposed around a guide structure extending from the air spring head for slideably supporting the end of the tubular air spring to prevent adjacent wall portions of the rolling sleeve bellows from contacting each other.

With this arrangement, the strut may be made to be slim so that it is particularly suitable for use in modern passenger cars, which have tight space constraints. Inspite of its slim design, the spring travel distance is relatively large. The width of the annular space between the outer and the inner guide structure of the air bellows is relatively small and requires a small distance between the walls guided by the guide surfaces formed thereby. As a result, there is the danger that the walls come into contact with each other when the angle of the spring strut increases so that the rubber bellows may be damaged or destroyed by rubbing. However, the guide arrangement of the shock absorber piston prevents such rubbing and also avoids that the shock absorber piston rod is subjected to bending forces. It is pointed out however, that the guide arrangement becomes actually effective only under relatively extreme conditions so that relative movement between the guide structure and the air spring piston may detrimentally affect the overall operating characteristics of the air spring strut only under extreme conditions. This is also advantageous with respect to the shock absorber wear particularly if it is taken into consideration that good slide characteristics between the guide structure and the air spring piston can be obtained by selection of appropriate pairs of material. It has been found, for example, to be advantageous if the guide sleeve consists of stainless steel and the slide ring that may come into contact with the guide sleeve consists of a plastic material such as a polyamide, which exhibits good sliding properties even without lubricants.

It has also been found to be advantageous if the guide sleeve is so connected to the air spring head that it contributes in providing stiffness to the air spring head in the area where it receives the piston rod of the shock absorber. Preferably, this reception area is formed by a collar on the air spring head onto which the guide sleeve is pressed so that no additional fastening means are needed.

The guide or slide ring is preferably disposed at the upper part of the air spring piston and attached to its upper end (by clips) such that the slide ring is disposed within the upper end area of the air spring bellows. With respect to the design location, the guide or slide ring is arranged in axial overlap with the sleeve-like guide structure although, in accordance with the invention, this guide structure does not extend over the full length of movement of the air spring piston with the slide ring attached thereto. In order still to provide for a limit of movement in radial direction, which prevents the bellows walls from rubbing against each other, the piston rod is provided with an additional guide sleeve in axial extension of the sleeve-like guide structure. The guide sleeve preferably has a smaller diameter than the guide sleeve structure and, at the same time, receives a travel limit bumper for the shock absorber cylinder.

Further details and features of the arrangement according to the invention will be described below in greater detail on the basis of the accompanying drawings.

DESCRIPTION OF A PREFERRED EMBODIMENT

Figure 1:
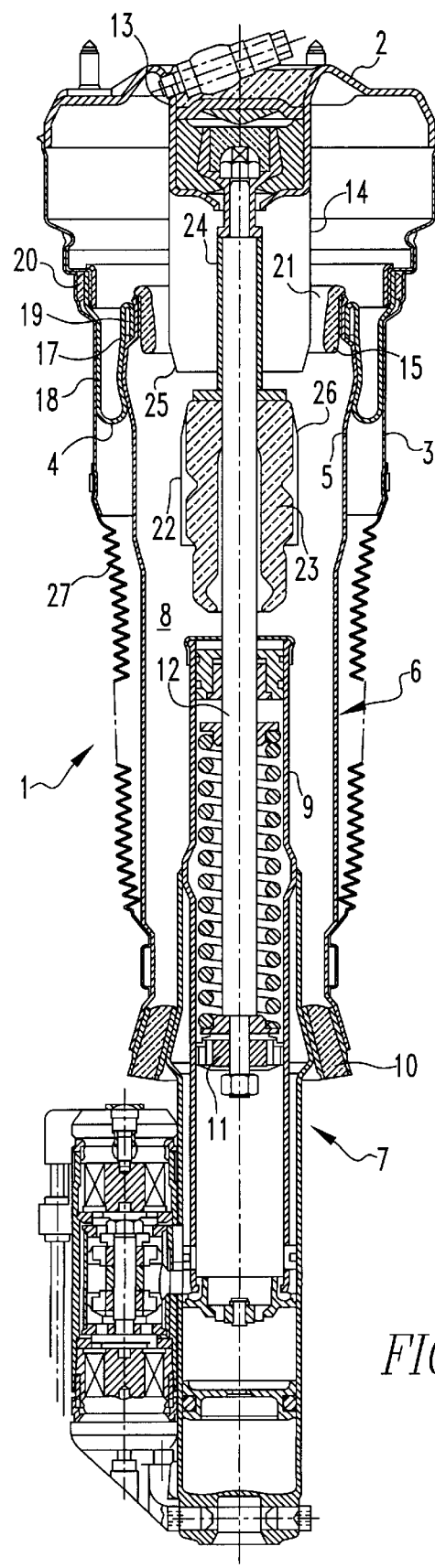
FIG. 1 is a cross-sectional view of an air spring strut in the normal position when installed in a motor vehicle that is about in a center position between a fully extended and a fully compressed spring strut.

The air spring strut shown in the figures is generally indicated by the reference numeral 1. It is part of a wheel suspension of a motor vehicle and is mounted at its upper end to a vehicle body and is connected at its lower end to an element of the vehicles wheel suspension. At its top end, the air spring strut 1 has an air spring head 2 by way of which it is mounted to the vehicle body, which however is not shown. The air spring head 2 is connected to a pressurized air source in a well-known manner. The air spring head 2 includes a cylindrical extension 3 as an outer guide structure for an air spring bellows 4, which forms a loop extending annularly between the cylindrical extension 3 and an inner guide structure 5. The inner guide structure 5 is formed by a wall portion of the air spring piston 6.

The air spring strut 1 further includes a shock absorber 7 which, over part of its length, is surrounded by the air spring head 2 and the air spring piston 6. The air spring head 2, the air spring bellows 4 and the air spring piston 6 form the outer boundary of an air space 8. The air spring piston 6 is supported at its end remote from the air spring head 2 on the shock absorber housing 9 so as to form a seal therewith, but still being cardanically movable relative thereto. In the embodiment shown, the air spring piston 6 is supported on the shock absorber housing 9 by a cardanic piston bearing structure formed by an elastic annular body 10, which is disposed between, and sealed to, both the shock absorber housing 9 and the air spring piston 6. At its lower end opposite the air spring head 2, the shock absorber housing 9 is connected to a wheel suspension element of a vehicle wheel suspension in a wellknown manner.

The housing 9 of the shock absorber or oscillation damper 7, which has adjustable damping characteristics, includes a damper piston 11 having a piston rod 12 extending from the housing 9 into the air spring head 2, where it is elastically supported. The air spring head 2 includes in the center thereof an annular support structure 13 which surrounds the elastic support structure for the piston rod 12 and which is not described in detail. The annular support structure 13 in the air spring head 2 serves at the same time as a retaining means for a guide sleeve 14. It surrounds the annular support structure 13 and is axially pressed thereon so as to be firmly engaged therewith. The guide sleeve 14 extends axially beyond the support structure 13 toward the shock absorber 7 and surrounds the piston rod 12 in spaced relationship therefrom. It extends axially into the interior of the air spring piston 6 bounding the air space 2. In FIG. 1, the air spring strut 1 is shown in a position which it assumes normally when installed in a vehicle that is in a center position between fully extended and fully compressed end positions. In this position, the guide sleeve 14 is disposed in radially overlapping relation with a guide ring 15, which is disposed at the inner circumference at the upper end of the air spring piston 6 and which surrounds the guide sleeve 14 in spaced relationship.

The guide ring 15 is attached to the upper end of the air spring piston 6, to which also the air spring bellows 4 is attached, by a clip structure in a simple manner. Preferably, the guide ring 15 is flat with a slightly curved inner surface configuration and is rounded at its axial ends. It consists of a material with good sliding properties such as a plastic material on polyamide base whereby advantageous friction conditions are provided when the guide ring 15 contacts the guide sleeve 14. The guide sleeve preferably consists of stainless steel and has a smooth polished surface without protective surface coating which could be rubbed off during contact.

As pointed out, the guide ring 15 at the upper end of the air spring piston 6 axially overlaps the guide sleeve 14. The air spring bellows 4 includes wall portions 17 and 18, which are radially supported at the inside on the air spring piston 6 and at the outside on the air spring head extension 3 with a loop 16 disposed therebetween. During operation the bellows 4 rolls along the inner guide structure 5 formed by the air spring piston 6 and the outer guide structure formed by the cylindrical extension 3 of the air spring head 2. The wall portions 17 and 18 of the bellows 4 are fixed at their axial ends to the inner guide structure 5 and the outer guide structure 3 respectively, by way of support rings 19 and 20.

In the position as shown in FIG. 1, the guide ring 15 surrounds the guide sleeve 14 in radially spaced relationship such that an annular gap 21 is provided which is sufficiently large to avoid contact between the guide ring 15 and the guide sleeve 14 during normal movement of the spring strut 1 when there is little or no side deflection.

Considering component manufacturing tolerances, the width of the annular gap 21 is so selected that the bellows wall portions 17 and 18 will never contact each other, no matter what the degree of side deflection of the air spring is. Consequently, the width of the annular gap 21 is selected to be smaller than the radial distance between the bellows wall portions 17 and 18 to prevent frictional contact between the bellows wall portions 17 and 18. Such contact could result in damage to the air spring bellows 4 which has only a relatively thin wall to facilitate its deformation upon rolling during operation of the air spring strut. The radial support between the guide sleeve 14 and the guide ring 15, which will be explained later, permits a very slim air spring strut design which is advantageous when considering the space restraints to which wheel suspensions, particularly front wheel suspensions of passenger cars are subjected. It permits the side deflection of the air spring strut, which is caused by the kinematics of the wheel suspension with little bending tension in the spring strut. To achieve this result, the radial support between the guide sleeve 14, which is firmly connected to the vehicle body mounted air spring head 2, and the guide ring 15 is utilized which is mounted on the air spring piston 6. The air spring piston 6 is supported on the shock absorber housing 9 cardanically by the elastic annular body 10 so that transverse forces as they occur during side deflections of the spring strut do not detrimentally affect the spring and dampening functions of the air spring strut 1. Especially, damage to the air spring bellows is prevented.

If, for design reasons, the guide sleeve 14, which is attached to the air spring head 2, cannot be long enough to serve as guide structure for the guide ring 15 over the full length of spring travel, then the guide sleeve 14 may be, as shown in FIG. 1, quasi-extended by a support sleeve 22 mounted on the piston rod 12. As shown in FIG. 1, the support sleeve 22 at the forms same time a receiver for the stop buffer 23 which is engaged by the shock absorber housing 9 upon full compression of the spring strut 1.

The support sleeve 22 is mounted on the elastic piston support structure within the annular support structure 13 of the air spring head 2 by way of a support tube 24, which receives and reinforces the piston rod 12.

The end portion 25 of the guide sleeve 14 adjacent the support sleeve 22 is slightly conically constricted and so is the adjacent end portion 26 of the support sleeve 22. In this way, a smooth transition is provided between the guide sleeve 14 and the smaller diameter support sleeve 22 when the air spring strut is sidewardly displaced as shown in FIG. 2 so as to provide uniform guidance for the guide ring 15.

Figure 2:
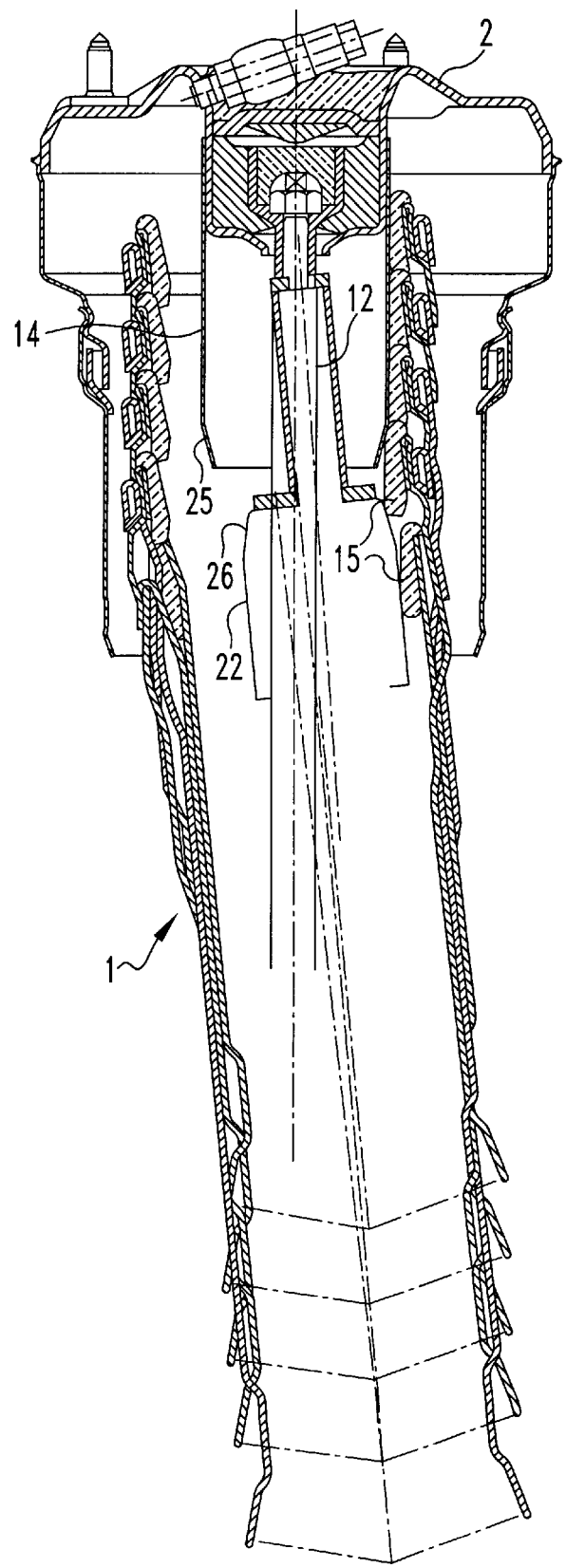
FIG. 2 is a partial view of an air spring strut according to FIG. 1 in a deflected position wherein various tilt positions of the air spring piston with respect to the air spring head and the guide sleeve as they occur with different spring positions are indicated.

FIG. 2 shows the side guide structure for the air spring piston 6 during sideward deflection of the air spring strut 1, where the lower part of the air spring strut 1, which is connected to the wheel mount, is slightly tilted in one direction and the upper part of the spring strut 1 is slightly tilted in the opposite direction. This would lead to a contact between the wall portions 17 and 18 of the bellows if excessive deflection of the air spring strut 1 would not be prevented by the side support for the air spring piston 6 in the area of the bellows by way of the guide ring 15. The guiding of the guide ring 15 on the support sleeve 22 and then on the guide sleeve 14 is indicated in FIG. 2. When the air spring strut 1 is extended, the support sleeve 22 forms a side support for the guide ring 15. Upon compression of the air spring strut 1, the side support for the guide ring 15 is provided by the guide sleeve 14. FIG. 2 further shows that the conical restriction of the support sleeve 22 and the guide sleeve 14 at their adjacent ends provides for a smooth transition between the two components, inspite of the smaller diameter of the support sleeve 22. As a result, the guide ring 15 is also properly guided in the transition area between the guide sleeve 14 and the support sleeve 22.

The arrangement accordingly provides for an air spring strut, which will not permit contact between the wall portions of the bellows even during extreme sideward deflection of the strut from its normal position. The bellows are always held in properly spaced relationship, but still permit a relatively slim design requiring relatively little installation space.

In order to prevent dirt from entering the area of the air spring bellows 4, a corrugated bellows 27 extends from the lower end of the air spring piston 6 to the cylindrical extension 3 of the air spring head 2 of the air spring strut 1.

What is claimed is:

1. An air spring strut for a wheel suspension of a motor vehicle body, including an air spring head for support on such motor vehicle body, a cylindrical extension axially projecting from said air spring head, a shock absorber having at one end a piston rod extending into said air spring head and being resiliently supported therein and a cylinder receiving said piston rod with a damper piston disposed in said cylinder, a tubular air spring piston sealingly mounted to said cylinder and extending therefrom axially around said piston rod toward said air spring head and into said cylindrical extension, a rolling sleeve bellows having opposite ends, one connected to said cylindrical extension and the other to said tubular air spring piston with a loop formed between said cylindrical extension and said tubular air spring piston, said air spring piston being connected to said shock absorber cylinder so as to be cardanically movable thereon and having at its opposite end adjacent said air spring bellows a slide structure, and a guide structure extending axially from said air spring head and into said slide structure for slidably supporting the end of said tubular air spring piston when said air spring strut is deflected sidewardly thereby to prevent contact between adjacent wall portions of said rolling bellows.

2. An air spring strut according to claim 1, wherein said guide structure is formed by a sleeve extending from said air spring head and surrounding said piston rod.

3. An air spring strut according to claim 1, wherein said air spring head includes an annular support structures resiliently engaging said one end of said piston rod and said guide sleeve is pressed onto said annular support structure.

4. An air spring strut according to claim 1, wherein said slide structure includes a guide ring disposed around said guide sleeve in spaced relationship therefrom.

5. An air spring strut according to claim 4, wherein said guide ring consists of a plastic material.

6. An air spring strut according to claim 5, wherein said guide ring is attached to the inside of said air spring piston.

7. An air spring strut according to claim 6, wherein said guide ring is attached to said air spring piston by a clip-on connection.

8. An air spring strut according to claim 2, wherein said piston rod has a support sleeve mounted thereon so as to form an axial extension of guide sleeve.

9. An air spring strut according to claim 8, wherein said support sleeve is disposed directly adjacent the axial end of said guide sleeve.

10. An air spring strut according to claim 9, wherein said guide sleeve has a conical end portion adjacent said support sleeve so as to reduce its diameter toward the support sleeve.

11. An air spring strut according to claim 9, wherein said support sleeve has a conical end portion reducing its diameter toward said guide sleeve.

12. An air spring strut according to claim 8, wherein said support sleeve is closed at its end adjacent said guide sleeve and a stop buffer is disposed in said support sleeve for limiting the travel length of said piston rod into said cylinder.

13. An air spring strut according to claim 4, wherein the space provided between said guide ring and said guide sleeve has a smaller gap width than the gap formed between the cylindrical extension of said air spring head and said inner guide structure formed by said air spring piston.

14. An air spring strut according to claim 4, wherein said support sleeve has a smaller diameter than said guide sleeve.

15. An air spring strut according to claim 1, wherein said air spring piston is connected to said shock absorber cylinder by an elastic bearing structure.

16. An air spring strut according to claim 15, wherein said elastic bearing structure comprises an elastic ring connected to said air spring piston and to said shock absorber cylinder.

* * * * *